United States Patent
Schmidt et al.

[11] Patent Number: 5,497,863
[45] Date of Patent: Mar. 12, 1996

[54] ROTARY DAMPER

[75] Inventors: Klaus Schmidt, Henstedt/Ulzburg; Roland Klein, Ammersbek, both of Germany

[73] Assignee: ITW-ATECO GmbH, Norderstedt, Germany

[21] Appl. No.: 418,126

[22] Filed: Sep. 6, 1994

[30] Foreign Application Priority Data

Sep. 3, 1993 [DE] Germany .......... 43 29 758.7

[51] Int. Cl.$^6$ .......... F16F 9/30; F16F 9/36
[52] U.S. Cl. .......... 188/306; 188/322.17; 188/322.5
[58] Field of Search .......... 16/51–54, 57; 277/38, 39, 95, 152; 188/290, 296, 306–310, 322.5, 322.16–322.18

[56] References Cited

U.S. PATENT DOCUMENTS

| | | | |
|---|---|---|---|
| 1,068,329 | 7/1913 | Derihon | 188/309 |
| 4,653,616 | 3/1987 | Mizusawa | 16/51 X |
| 4,691,589 | 9/1987 | Arakawa | 74/573 F |
| 4,691,811 | 9/1987 | Arakawa et al. | 188/290 |
| 4,697,673 | 10/1987 | Omata | 188/290 |
| 4,796,733 | 1/1989 | Nakayama | 188/291 |
| 4,830,151 | 5/1989 | Numata | 188/290 |
| 5,269,397 | 12/1993 | Kawamoto et al. | 188/322.5 X |
| 5,301,775 | 4/1994 | Nedbal et al. | 188/322.5 |

FOREIGN PATENT DOCUMENTS

| | | |
|---|---|---|
| 3726031 | 2/1988 | Germany . |
| 4119090 | 12/1991 | Germany . |
| 60-29018 | 8/1985 | Japan . |
| WO880988 | 5/1988 | WIPO . |

OTHER PUBLICATIONS

Fachkunde fur metallverarbeitende Berufe, 38 Aufl, Verlag Europa Lehrmittel, Wuppertal–Barmen, Seite 249, Pre Sep. 6, 1994.

*Primary Examiner*—Robert J. Oberleitner
*Assistant Examiner*—Alfred Muratori
*Attorney, Agent, or Firm*—Schwartz & Weinrieb

[57] ABSTRACT

A rotary damper comprising a housing and a cylindrical rotor rotatably supported in the housing, and an annular clearance between the rotor and housing being filled with a viscous flowable material, wherein the housing comprises a pivot extending from one end inwardly within the housing and forming an annular space with the housing; and the rotor comprises an annular cylindrical portion received by the annular space and forming annular clearances filled with the viscous material at both sides thereof.

13 Claims, 1 Drawing Sheet

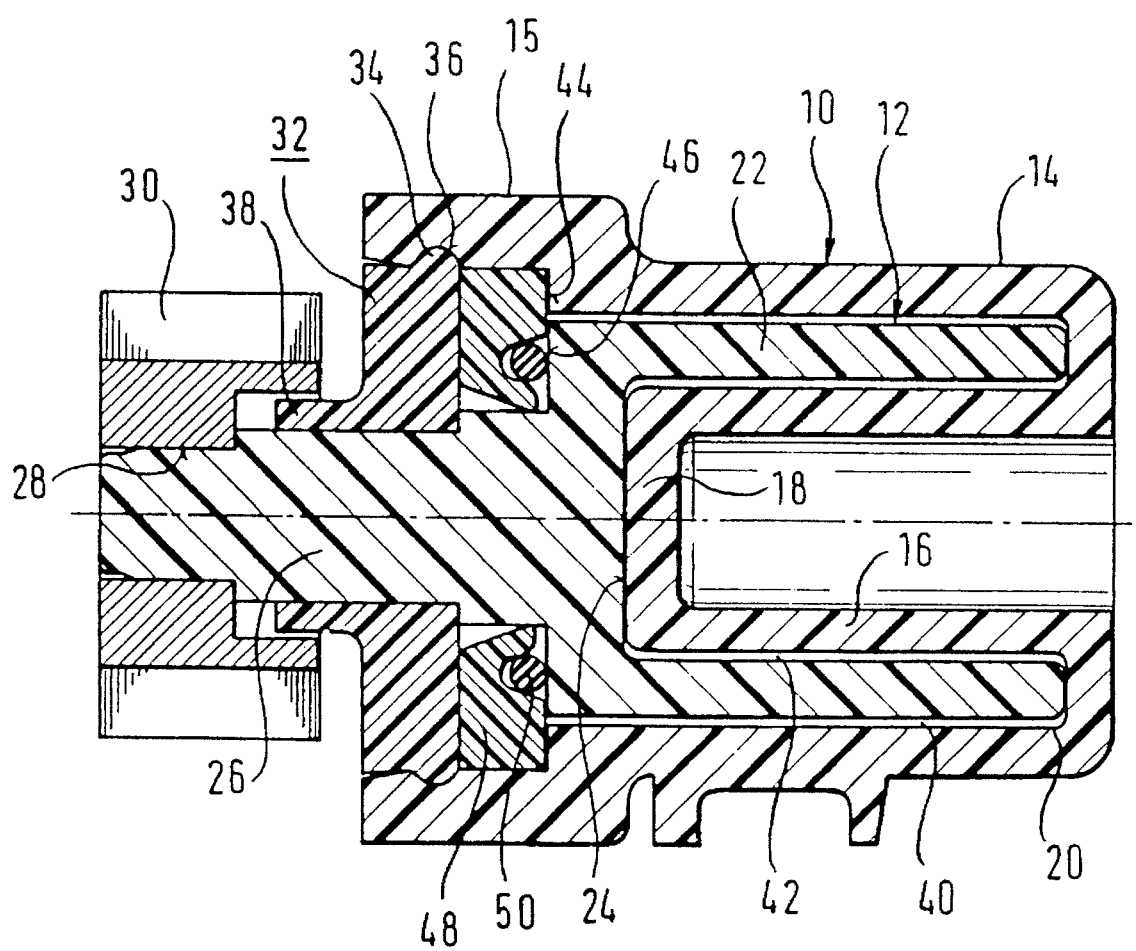

5,497,863

ROTARY DAMPER

FIELD OF THE INVENTION

The present invention relates generally to a rotary damper, and more particularly to a rotary damper exhibiting improved dampening characteristics.

BACKGROUND OF THE INVENTION

A variety of appliances used in automotive vehicles such as supporting straps, glove box lids, asher tray covers or the like are actuated by spring means. Supporting straps, for example, are returned by springs to their basic or normal position. Glove box lids are brought to the open position after manually releasing a locking means. The travel of the movable elements is stopped by impacting a stop. This results in a more or less loud noise; moreover, there is no smooth motion and possibly there might be a swinging back or rebound of the appliance element after stopping. Accordingly, dampening means are known providing for a more or less dampened motion in approaching the end stop.

German utility model 87 07 936 discloses a so-called rotary damper comprising a shaft having a radial vane disposed within a chamber filled with a liquid fluid such that the fluid is displaced from one chamber section through a throttle passage into another chamber section when the vane is rotated towards either one of two radial stops spaced peripherally with respect to each other. The throttle passage may be defined by a gap between the vane and the inner wall of the housing as disclosed in DE 33 16 756. Alternatively, or in addition, the vane may be provided with at least one opening through which the viscous fluid passes.

DE 39 21 326 discloses a disk-shaped rotor which is centrally located in a hollow space provided by the housing, all surfaces of the rotor being in contact with the viscous fluid.

The braking torque generated by a rotary damper of this type depends of course on the size of the surface of the rotor and housing disposed in contact with the viscous fluid. Thus, the torque increases when the dimensions of these elements are made larger. However, in many cases it is desired to build a rotary damper of this type as small as possible.

OBJECT OF THE INVENTION

Therefore, it is the object of the present invention to provide a rotary damper having relatively small dimensions, but developing a high dampening torque.

SUMMARY OF THE INVENTION

According to the invention, the rotary damper has a housing comprising a pivot extending from one end into the housing defining an annular space with the housing. The rotor includes a cylindrical portion which is received in the annular space and which defines therewith annular clearances situated on both sides of the pivot, wherein the clearances are filled with viscous material. In this way a pair of cylindrical clearances is formed substantially increasing the rotary resistance. As known, of course, the rotary resistance depends on the geometrical dimensions of the clearances. By reducing the cylindrical portion to a desired length, the torque may even be decreased if this is required. Therefore, the structure according to the invention allows adjustment of a desired dampening value between an upper maximum and a lower minimum limit by selecting the axial length of the cylindrical portion. Accordingly, any other changes with a view to the structure and other dimensions are not required.

Preferably, the housing is made of a plastic material. According to an embodiment of the invention, the pivot is hollow and integrally formed with the housing. The pivot is formed by recessing an end wall portion of the housing, preferably defining an inner end face so that the axial extension of the rotor into the housing is limited by the inner end face of the pivot. According to another embodiment of the invention, the rotor comprises a trunnion at the end opposite the cylindrical portion of the rotor, wherein the trunnion is supported by a bearing plate seated within the housing in a snap-in connection or mode.

In order to prevent the viscous material from leaking out of the housing, a sealing element is preferably provided. According to an embodiment of the invention, the sealing element may be arranged between the bearing plate and shoulders of the housing and rotor facing the bearing plate.

In assembling the rotary damper, the housing is first filled with the viscous material. Subsequently, the rotor is inserted in the housing. To do this in a manner free of problems, according to an embodiment of the invention, the cylindrical portion comprises at least one recess open towards the free end thereof and extending approximately along the entire length of the cylindrical portion. Displaced fluid escapes through the recess thus facilitating the assembly of the rotor in the housing.

BRIEF DESCRIPTION OF THE DRAWINGS

Various other objects, features, and attendant advantages of the present invention will become more fully appreciated from the following detailed description, when read in connection with the accompanying drawing, wherein:

The SOLE FIGURE is a longitudinal cross-sectional view of the new and improved rotary damper constructed in accordance with the principles of the present invention.

DETAILED DESCRIPTION OF THE PREFERRED EMBODIMENT

The damper shown in the drawings comprises a rotational symmetrical housing 10 in which a rotational symmetrical rotor 12 is mounted. The housing includes a first cylindrical portion 14 and a second cylindrical portion 15 having a larger diameter. The housing further includes a hollow cylindrical pivot 16 extending from one end of the housing 10 towards the inner space of the housing, the pivot having an end wall 18. A cylindrical space 20 is formed between the pivot 16 and the housing wall of the housing portion 14.

The rotor 12 has a cylindrical portion 22 projecting into the annular space 20 of the housing 10. An inner radial wall 24 of the rotor 12 contacts the inner end wall 18 of the pivot 16. A stepped axial trunnion 26 extends through the open end of the housing 10. A pinion 30 is secured to a flattened portion 28 of the trunnion 26.

A bearing flange 32 for the trunnion 26 seats in the second portion 15 of the housing 10, wherein an annular rib 34 snaps into an annular recess 36 of the portion 15. An axial portion 38 of the bearing plate 32 extends into a space which is formed between the radially inner portion of the pinion 30 and the outer peripheral surface portion of the trunnion 26.

The support of the rotor 12 is such that the cylindrical portion 22 and the annular space 20 define a pair of annular clearances 40 and 42 of approximately equal dimension.

Shoulders 44, 46 are formed in the rotor 12 and housing 10 at the side facing away from the pivot 16, wherein the shoulders are in contact with an annular sealing element 48, wherein the other side thereof contacts the bearing plate 32. The sealing element 48 has a lip contacting the trunnion 26, and an O-ring 50 is inserted in the space which is defined by the lip and the main body of the element 48, the ring 50 contacting the shoulder 46 of the rotor 12.

For assembly the housing 10 is first filled with a suitable viscous flowable fluid, for example silicone oil or silicone gel. Thereafter, the rotor 12 is inserted. For this part of the assembly operation, the rotor has at least one recess extending from the free end thereof through which the cylindrical portion 22 may be inserted. Subsequently that the sealing element 48 is inserted as well as the bearing plate 32. The rotor 12 and housing 10 as well as the bearing plate 32 are made of plastic material so that the snapping connection shown may be easily achieved. This provides for biasing the sealing element 48.

The drawing shows the cylindrical portion 22 extending to the closed end of the annular space 20. It is possible, however, to make the cylindrical portion 22 shorter, whereby the torque generated in the clearances 40, 42 is correspondingly reduced.

Obviously, many modifications and variations of the present invention are possible in light of the above teachings. It is therefore to be understood that within the scope of the appended claims, the present invention may be practiced otherwise than as specifically described herein.

We claim:

1. A rotary damper, comprising:

a housing having a radially outer wall and a longitudinal axis;

a cylindrical rotor rotatably supported within said housing and having an annular configuration;

an axially recessed pivot section of said housing extending from an end wall of said housing axially inwardly into said housing toward an opposite open end of said housing and forming with said radially outer wall of said housing an annular space within said housing for accommodating said cylindrical annular rotor;

a viscous flowable material disposed within said annular space defined between said pivot section of said housing and said radially outer wall of said housing such that when said cylindrical rotor is disposed within said annular space, a pair of annular clearances, filled with said viscous material, are defined between said cylindrical rotor and said pivot section of said housing, and between said cylindrical rotor and said radially outer wall of said housing, respectively, such that said viscous material is disposed upon both opposite sides of said cylindrical annular rotor;

first radially extending shoulder means defined upon said radially outer wall of said housing;

second radially extending shoulder means defined upon said cylindrical rotor;

a trunnion integrally formed with said cylindrical rotor and extending axially outwardly from said open end of said housing;

a bearing plate, having an aperture defined therein through which said trunnion of said cylindrical rotor passes, fixedly mounted within said open end of said housing; and a sealing element compressed between and in contact with said bearing plate and said first and second radially extending shoulder means of said housing and said rotor so as to also sealingly engage said trunnion and said radially outer wall of said housing.

2. A rotary damper according to claim 1, characterized in that said pivot is formed integrally with said housing and is hollow.

3. A rotary damper, according to claim 1, wherein:

an axially inner end portion of said pivot section abuts a correspondingly formed seating surface of said rotor such that said rotor is properly disposed within said annular space defined between said outer wall of said housing and said pivot section.

4. A rotary damper as set forth in claim 1, wherein:

said first and second shoulder means of said housing and said cylindrical rotor are disposed within a common radial plane.

5. A rotary damper as set forth in claim 1, wherein:

said bearing plate is fixedly mounted within said open end of said housing by means of a snap-in connection.

6. A rotary damper as set forth in claim 5, wherein said snap-in connection comprises:

an annular recess defined within said outer wall of said housing; and an annular rib defined upon said bearing plate for reception within said annular recess of said outer wall of said housing.

7. A rotary damper as set forth in claim 1, wherein:

said sealing element comprises an annular lip annularly surrounding and sealingly engaging said trunnion of said cylindrical rotor.

8. A rotary damper as set forth in claim 7, wherein:

said annular lip of said sealing element is radially spaced from a main portion of said sealing element; and an O-ring is disposed within an annular space defined between said annular lip and said main portion of said sealing element.

9. A rotary damper as set forth in claim 1, wherein:

said trunnion comprises an axially extending flattened portion; and a pinion is disposed upon said flattened portion of said trunnion for imparting rotation thereto.

10. A rotary damper as set forth in claim 9, wherein:

said pinion comprises an annular portion annularly spaced from said trunnion; and said bearing plate comprises an axially extending annular portion disposed within an annular space defined between said annularly spaced portion of said pinion and said trunnion.

11. The rotary damper as set forth in claim 1, wherein:

said viscous material comprises silicone oil.

12. The rotary damper as set forth in claim 1, wherein:

said viscous material comprises silicone gel.

13. The rotary damper as set forth in claim 1, wherein:

said housing and said rotor are both fabricated from a plastic material.

\* \* \* \* \*